US010679013B2

(12) United States Patent
Raanani et al.

(10) Patent No.: US 10,679,013 B2
(45) Date of Patent: Jun. 9, 2020

(54) IOT-BASED CALL ASSISTANT DEVICE

(71) Applicant: AffectLayer, Inc., Tel Aviv-Jaffa (IL)

(72) Inventors: Roy Raanani, Mill Valley, CA (US); Russell Levy, Raanana (IL); Micha Yochanan Breakstone, Raanana (IL)

(73) Assignee: AffectLayer, Inc., Tel Aviv-Jaffa (IL)

( * ) Notice: Subject to any disclaimer, the term of this patent is extended or adjusted under 35 U.S.C. 154(b) by 4 days.

(21) Appl. No.: 16/168,663

(22) Filed: Oct. 23, 2018

(65) Prior Publication Data

US 2019/0057079 A1 Feb. 21, 2019

Related U.S. Application Data

(63) Continuation-in-part of application No. 16/017,646, filed on Jun. 25, 2018, now Pat. No. 10,530,929.

(Continued)

(51) Int. Cl.

| H04M 3/00 | (2006.01) |
|---|---|
| H04M 5/00 | (2006.01) |
| G06F 40/35 | (2020.01) |
| G10L 15/08 | (2006.01) |
| H04M 3/51 | (2006.01) |
| H04M 3/42 | (2006.01) |
| G06F 16/33 | (2019.01) |

(Continued)

(52) U.S. Cl.
CPC .......... *G06F 40/35* (2020.01); *G06F 16/3344* (2019.01); *G06F 40/216* (2020.01); *G10L 15/08* (2013.01); *G10L 15/1822* (2013.01); *G10L 15/22* (2013.01); *H04M 3/2236* (2013.01); *H04M 3/42059* (2013.01); *H04M 3/5141* (2013.01); *H04M 3/5175* (2013.01); *H04M 3/5183* (2013.01); *G10L 25/63* (2013.01); *G10L 2015/088* (2013.01); *G10L 2015/223* (2013.01); *H04M 2201/40* (2013.01); *H04M 2203/2038* (2013.01); *H04M 2203/357* (2013.01)

(58) Field of Classification Search
CPC .......... H04M 3/5183; H04M 3/42059; H04M 3/5141; H04M 2203/2038
USPC .............. 379/265.07, 265.05, 265.06, 266.1, 379/265.03
See application file for complete search history.

(56) References Cited

U.S. PATENT DOCUMENTS 7,023,979 B1 4/2006 Wu et al.
7,039,166 B1 5/2006 Peterson et al.
(Continued)

*Primary Examiner* — Thjuan K Addy
(74) *Attorney, Agent, or Firm* — Perkins Coie LLP

(57) ABSTRACT

A call assistant device is used to command a call management system to perform a specified task in association with a specified call. The call assistant device can be an Internet of Things (IoT) based device, which can include one or more buttons and connect to a communication network wirelessly. When a user activates the call assistant device, e.g., presses a button, the call assistant device sends a message to the call management system to perform a specified task. Upon receiving the message, the call management system executes the specified task in association with a specified call of the user. The task to be performed can be any task that can be performed in association with a call, e.g., generating a summary of the call, bookmarking a specified moment in the call, sending a panic alert to a particular user, or generating an action item.

32 Claims, 14 Drawing Sheets

Related U.S. Application Data which is a continuation-in-part of application No. 15/168,675, filed on May 31, 2016, now Pat. No. 10,051,122.

(60) Provisional application No. 62/169,456, filed on Jun. 1, 2015, provisional application No. 62/169,445, filed on Jun. 1, 2015.

(51) Int. Cl.
    *H04M 3/22*     (2006.01)
    *G10L 15/18*     (2013.01)
    *G10L 15/22*     (2006.01)
    *G06F 40/216*     (2020.01)
    *G10L 25/63*     (2013.01)

(56) References Cited

U.S. PATENT DOCUMENTS

| | | |
|---|---|---|
| 7,487,094 B1 | 2/2009 | Konig et al. |
| 8,914,285 B2 | 12/2014 | Wasserblat et al. |
| 9,635,178 B2 | 4/2017 | Raanani et al. |
| 9,785,891 B2 | 10/2017 | Agarwal et al. |
| 9,900,436 B2 | 2/2018 | Raanani et al. |
| 10,051,122 B2 | 8/2018 | Raanani et al. |
| 10,530,929 B2 | 1/2020 | Raanani et al. |
| 2004/0098274 A1 | 5/2004 | Dezonno et al. |
| 2007/0038499 A1 | 2/2007 | Margulies et al. |
| 2009/0222313 A1 | 9/2009 | Kannan et al. |
| 2012/0072254 A1 | 3/2012 | McLean et al. |
| 2012/0250837 A1* | 10/2012 | Engleke ............ H04M 3/42161 379/52 |
| 2014/0025376 A1 | 1/2014 | Wasserblat et al. |
| 2014/0086402 A1 | 3/2014 | Kan et al. |
| 2014/0270133 A1 | 9/2014 | Conway et al. |
| 2014/0317030 A1 | 10/2014 | Shen et al. |
| 2015/0201077 A1 | 7/2015 | Konig et al. |
| 2015/0237213 A1 | 8/2015 | Chishtl et al. |
| 2015/0242860 A1 | 8/2015 | Kannan et al. |
| 2015/0254675 A1 | 9/2015 | Kannan et al. |
| 2015/0256675 A1 | 9/2015 | Sri et al. |
| 2015/0348570 A1 | 12/2015 | Feast et al. |
| 2016/0225372 A1 | 8/2016 | Cheung et al. |
| 2016/0352902 A1 | 12/2016 | Levy et al. |
| 2016/0352907 A1 | 12/2016 | Raanani et al. |
| 2017/0024679 A1* | 1/2017 | Lee ................ G06Q 10/063112 |
| 2017/0187880 A1 | 6/2017 | Raanani et al. |
| 2018/0309873 A1 | 10/2018 | Raanani et al. |

\* cited by examiner

IOT-BASED CALL ASSISTANT DEVICE

CROSS-REFERENCE TO RELATED APPLICATION(S)

This application is a continuation-in-part of U.S. application Ser. No. 16/017,646 titled "MODELING VOICE CALLS TO IMPROVE AN OUTCOME OF A CALL BETWEEN A REPRESENTATIVE AND A CUSTOMER" filed Jun. 25, 2018, which is a continuation-in-part of U.S. application Ser. No. 15/168,675 titled "MODELING VOICE CALLS TO IMPROVE AN OUTCOME OF A CALL BETWEEN A REPRESENTATIVE AND A CUSTOMER" filed May 31, 2016, now U.S. Pat. No. 10,051,122, issued Aug. 14, 2018, which claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, all of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

[i] Insidesales.com "Market size 2013" study

DETAILED DESCRIPTION

Figure 1:
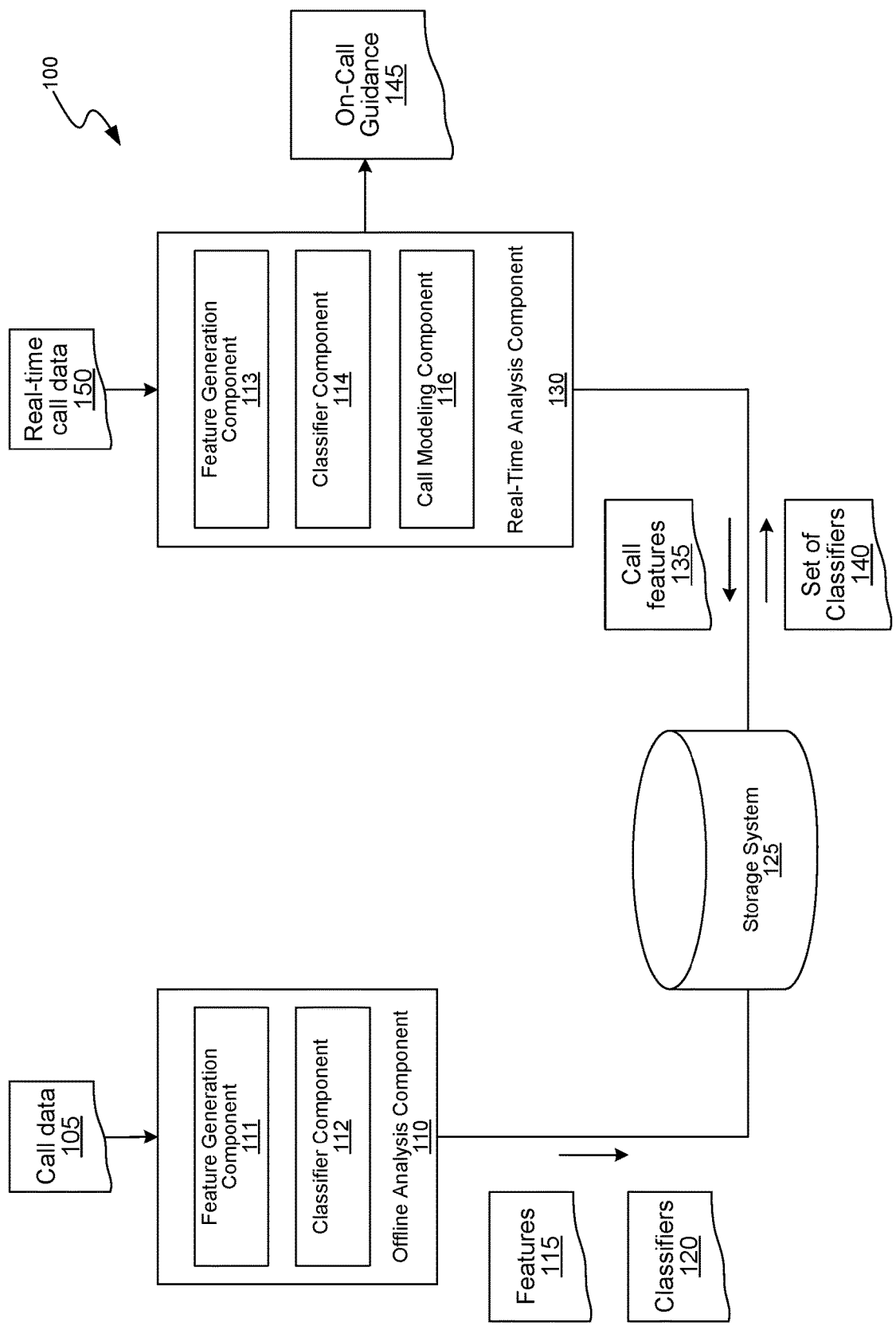
FIG. 1 is a block diagram of a call-modeling system in which the disclosed embodiments can be implemented.

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, summarization of a call, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the customer, extrovert/introvert matching, or gender or age agreement).

Note that a call can be any of telephone based, Voice over Internet Protocol (VoIP) based, video conference based, Virtual Reality (VR) based, Augmented Reality (AR) based, or based on any online meetings, collaborations or interactions, electronic mail (e-mail). The call can be a real-time call or a recording of a call. The recording can also be of a conversation that has happened between two or more speakers physically located in the same room. In some embodiments, a recording based on any online meetings, collaborations or interactions, or email can be a transcript of the corresponding interaction.

Further, the features can include not only aural features, but also non-aural features, e.g., visual features such as body language of a participant, and facial expressions of the participant, or any combination of aural and non-aural features. The features could also be generated from the transcripts of any of emails, online messages, and online meetings. In some embodiments, any of a word, a phrase, a text, emoji, symbols, or a combination thereof can be used to determine a particular feature. For example, it can be determined that a text such as "Ha Ha" or "rofl" in the transcript can indicate laughter.

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or a specific characteristic which occurs in the call. The event can be any event that is of specific interest for a specific application for which the call-modeling system is being implemented. An administrator of the call-modeling system can configure what events in a call have to be identified as a moment. For example, a moment can be laughter, engagement, fast-talking, open-ended questions, objections, or any combination thereof in a conversation. In some embodiments, the moments are identified automatically by a moment identification system. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a customer and a representative, the call-modeling system can analyze the call, identify the moments in the conversation, and tag, notify and/or share the moments with the representative's manager, peers, or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred). Further, the offline analysis component can extract the features using any of multiple techniques, e.g., rule-based technique, artificial intelligence (AI), machine learning (ML), or natural language processing (NLP).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a ML algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the ML algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted, or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call, in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Embodiments are also disclosed for a call assistant device that is used to command a call management system to perform a specified task in association with a specified call. In some embodiments, the call assistant device is an internet-of-things (IoT) based device, which includes one or more buttons each of which is configured to perform a specified task, a network component to connect to a communication network, e.g., wirelessly, and a memory to store data, e.g., command. Other configurations of the call assistant device are possible. For example, the call assistant device can have a touchscreen or a gesture-based input means instead of or in addition to the one or more buttons. When a user activates the call assistant device, e.g., presses a button, the call assistant device sends a message to the call management system to perform a specified task the call assistant device is configured to in association with a call in which the user participated or is participating. A task to be performed by the call management system can include any of a number of tasks that can be performed in association with a call, e.g., generating a summary of the call, bookmarking a specified event in the call, sending a panic alert to a particular user, starting or stopping recording, or generating an action item.

The call management system receives a message from the call assistant device and executes a specified task in response to receiving the message. The call management system analyzes the message to extract parameters, such as a device identification (ID) of the call assistant device, a timestamp indicative of a time at which the call assistant device is activated by the user, and a type of user input. The call management system determines the specified task and a specified call in association with which the specified task is to be performed based on the parameters and executes the specified task accordingly.

The result of the specified task can take many forms. For example, the result of a task such as summarizing a call can be generated as a document having a summary of the call, or an audio file having the summary. In another example, the result can also be a notification to the speakers on the call, e.g., vocal notification on the call, or via a textual notification, such as an electronic mail (e-mail), a text message, or an alert on a computing device associated with the speaker. In another example, the call management system can provide a graphical user interface (GUI) for the speaker to view the notification or the result.

The call management system can analyze the conversation of the specified call, e.g., based on the extracted features of the conversation, to determine the necessary data for performing the task. The features can include language-based features or video features, such as facial expression or body language of the speaker. For example, in a call between a representative speaker and a customer speaker, when the representative speaker presses a button on the call assistant device configured to generate action items from the call, the call management system analyzes the extracted features of the call, e.g., both the speech uttered by the speakers and the facial expression of the speakers, in determining the action items. The call management system can be trained using AI, ML, a process-driven technique (e.g., programmed by the representative) or a combination, to analyze the features for determining the necessary data for performing the task.

The call assistant device can connect to a communication network by wired or wireless means. In some embodiments, the call assistant device connects to the communication network wirelessly, e.g., using Bluetooth or Wi-Fi. If there is no network connectivity for the call assistant device, any commands issued by the user of the call assistant device is queued up in a memory of the call assistant device for later transmission, e.g., when the call assistant device obtains network connectivity. The call assistant device can be powered using a battery, which may be an interchangeable battery or a built-in battery that can be charged.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP, AI, ML. The features 115 can include transcripts of audio recordings, vocabulary, semantic information of conversations, summarization of a call, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, charisma, confidence, etc.), personal attributes (e.g., age, accent, and gender), and inter-speaker attributes that indicate a comparison between both the speakers (e.g., similarity of speech rate between the representative and the customer, extrovert/introvert matching, or gender or age agreement). Further, the features can include not only aural features, but also non-aural features, e.g., visual features such as body language of a participant, and facial expressions of the participant, or any combination of aural and non-aural features.

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the customer, extrovert/introvert matching, or gender or age agreement).

The features, when extracted from the conversations, can include attributes and values. The classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation.

The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a consumer user to explore various aspects of a conversation. For example, the search tool allows the consumer user to search for anything that came up on the call, e.g., both linguistic and meta-linguistic. The search tool can be used to further analyze the conversation, extract appropriate features, and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
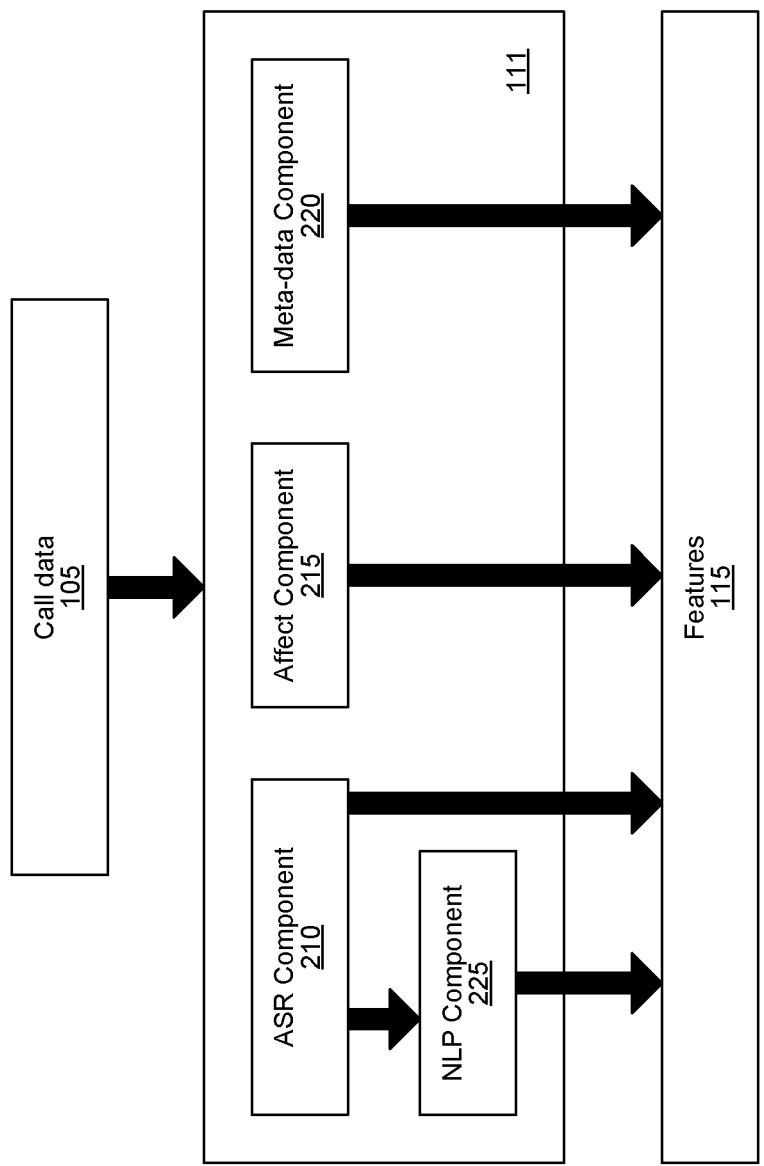
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, charisma, confidence, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency-Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, charisma, confidence, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112. One or more components of the feature generation component 111 can use AI and/or ML techniques to extract one or more of the features 115.

Figure 3:
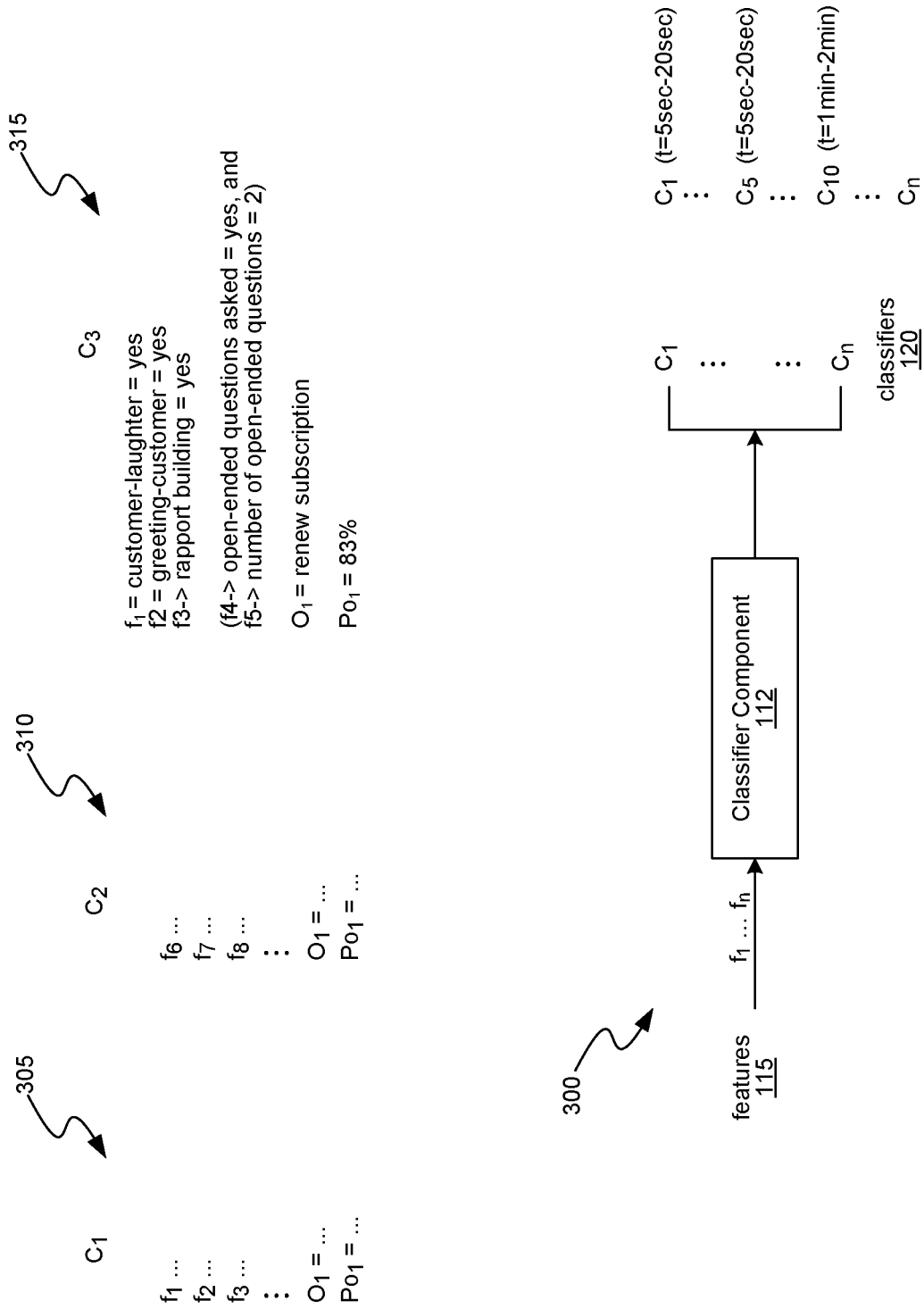
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"-"CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as an SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1→customer laughter=yes" "f2→greeting customer=yes," "f3→rapport building=yes," ("f4→open ended questions asked=yes," and "f5→number of open ended questions asked=2"), "outcome=renew subscription" "probability of outcome=83%."

Figure 4:
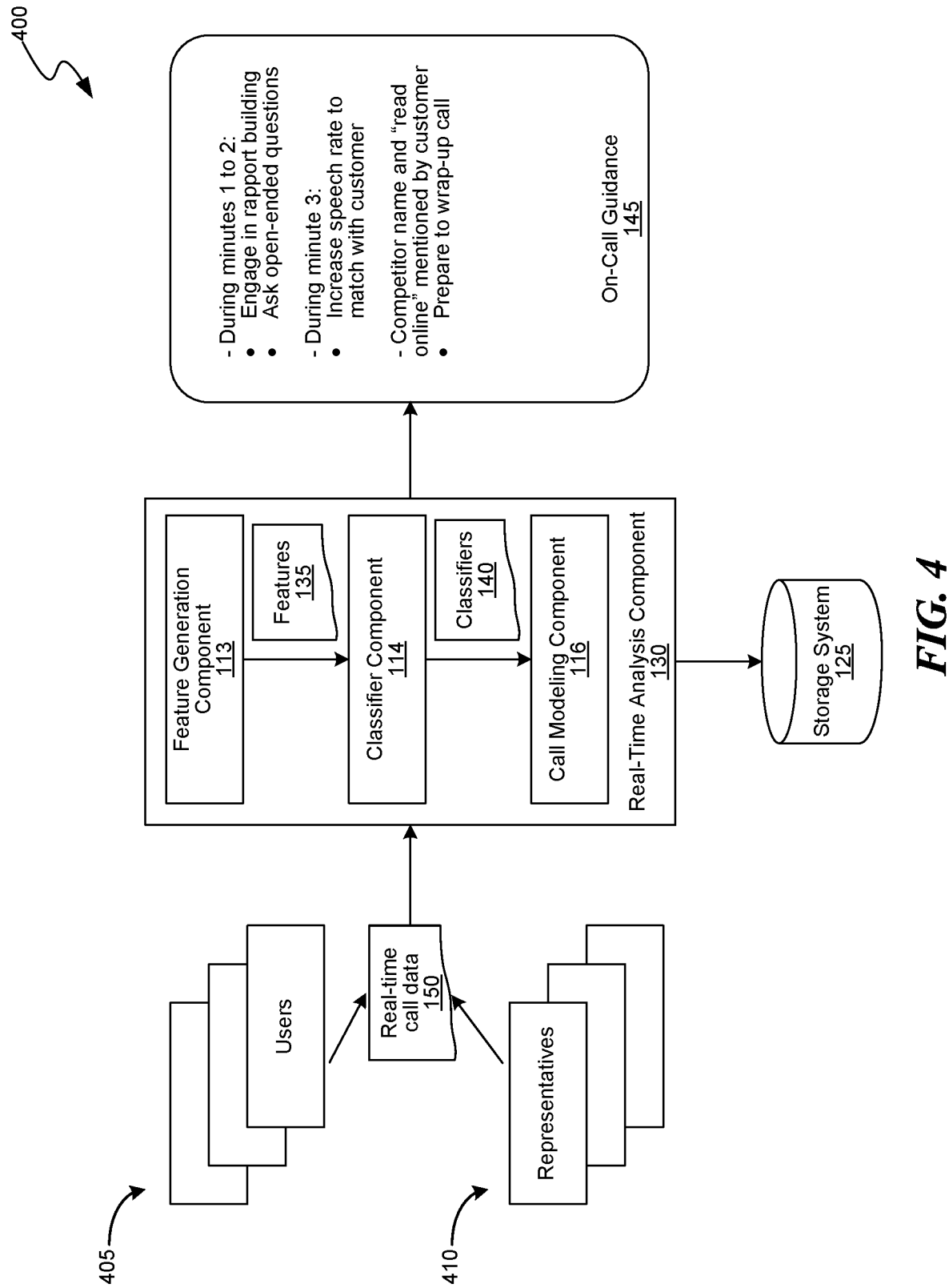
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call but could also be used to inform representatives and/or managers for better training and coaching in retrospect.

The real-time analysis component 130 may also be used to auto-populate information fields in a customer relationship management (CRM) system or a similar system.

Figure 5:
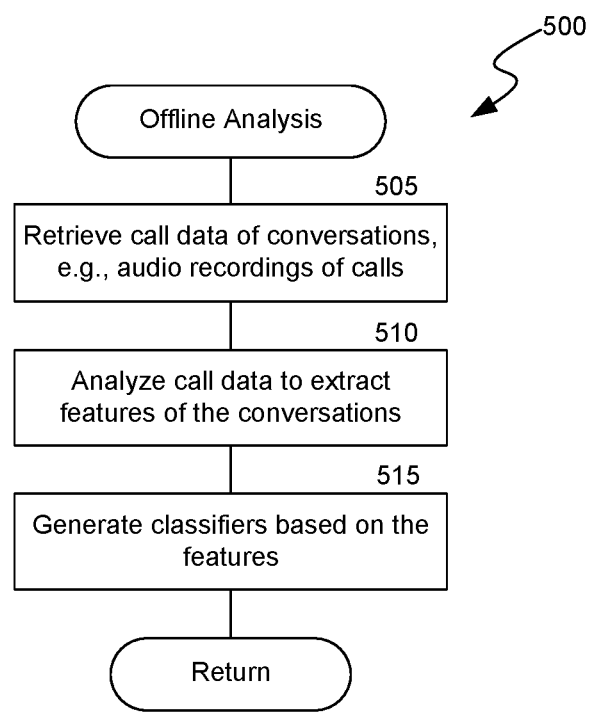
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, charisma, confidence, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
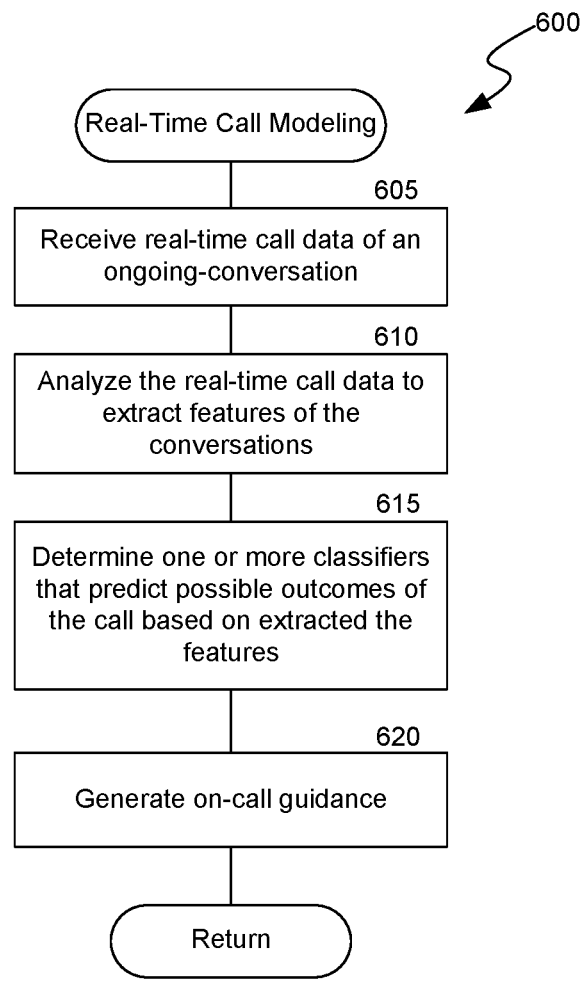
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real-time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
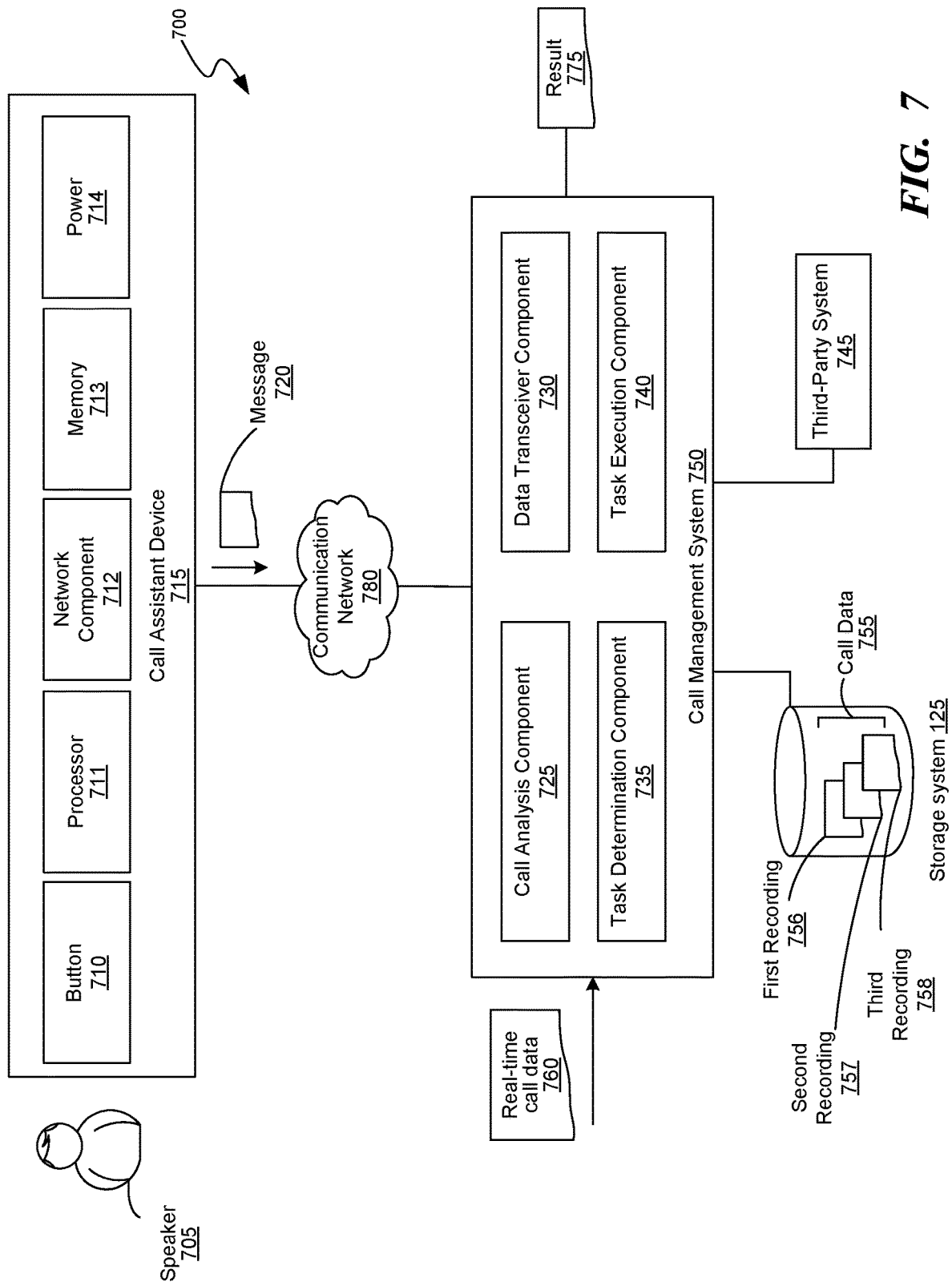
FIG. 7 is a block diagram of an environment in which a call assistant device can be implemented, consistent with various embodiments.

FIG. 7 is a block diagram of an environment 700 in which a call assistant device can be implemented, consistent with various embodiments. The environment 700 includes a call assistant device 715 that can be used by a user, e.g., speaker 705, to execute a specified task in association with a specified call of the speaker 705. For example, consider that the speaker 705 is a representative of an organization and is in a call with a customer or a potential customer of the organization. During the call, the speaker 705 may want to bookmark a specified time, moment or an event that occurs in the call, and the speaker 705 can do so by activating the call assistant device 715, e.g., invoking or pressing a button 710 of the call assistant device 715. Upon pressing the button 710, a call management system 750 can generate the bookmark for the call at the specified temporal location of the call. The speaker 705 may playback the call from the bookmarked location at a later time. Other examples of a task include generating a summary of the call, generating an action item, searching for information regarding a particular entity, such as an organization, being discussed in the call and generating the search results, sending a panic alert to a particular user, generating a summary a previous call, or sending a link to a particular document to the speakers on the call.

In some embodiments, the call assistant device 715 can also be configured to receive a voice command from the speaker 705. For example, the speaker can activate the call assistant device 715, e.g., by pressing the button 710, and then issue a voice command. After receiving the command, the call assistant device 715 can transmit the command to the call management system 750 for performing a task corresponding to the voice command. Some examples of such commands include:

[Press button] "please set a timer for 10 minutes"
[Press button] "set a reminder to wrap up 5 minutes before the meeting is scheduled to end"
[Press button] "set a reminder to send a summary after the call"
[Press button] "send participants a link to our whitepaper"
[Press button] "search our CRM for company X"
[Press button] "search the web for company Y"
[Press button] "can you quickly brief us on where we ended last call?"
[Press button] "please mute all participants"

The command issued may be a single utterance such as the examples above, or a series of dialogue commands. For example, the speaker can have the following conversation:

Speaker: [Press button] "please summarize our last call"
Call assistant device: "here is summary . . . "
Speaker: "and can you remind me who was on the call"
Call assistant device: "Dan, Dave, and Drew . . . "
Speaker: "cool, I see that Dan hasn't joined yet, did he accept the invite to this call?"
Call assistant device: "Yes"

In issuing a series of commands, the next command should be issued within a specified duration from the time (a) the previous command is issued or (b) result of the previous command is provided for the conversation to continue.

The call assistant device 715 can be an IoT-based device. The IoT is a network of physical devices embedded with any of electronics, software, sensors, actuators, and connectivity which enables these things to connect and exchange data. IoT involves extending Internet connectivity beyond standard devices, such as desktops, laptops, smartphones and tablets, to any range of traditionally dumb or non-internet-enabled physical devices and everyday objects. Embedded with technology, these devices can communicate and interact over a communication network, e.g., the Internet, and they can be remotely monitored and controlled.

The call assistant device 715 can include a processor 711, a network component 712, a memory 713, one or more buttons such as the button 710, and a power source 714. The button 710 is used to activate the call assistant device 715, e.g., send a command to the call management system 750 for performing a specified task. The processor 711 can generate the command in response to the speaker 705 activating the call assistant device 715. The network component 712 enables the call assistant device 715 to connect to a communication network 780, e.g., for sending the command to the call management system 750. The network component 712 can enable the call assistant device 715 to connect with the communication network 780 wirelessly, e.g., via Bluetooth or Wi-Fi. The memory 713 can be used to store data, e.g., such as a device ID of the call assistant device 715 and any other necessary data to be included in the command that may be used by the call management system 750 for executing the specified task. The power source 714 can be a battery, which may be an interchangeable battery or a built-in battery that can be charged. Further, the button 710 can be a physical button or a touchscreen button. Further yet, in some embodiments, the call assistant device 715 can be activated using means other than a button, such as gestures, touch, shake, or voice input.

In some embodiments, the call assistant device 715 has multiple buttons and each of the buttons is configured to perform a different task. Further, the speaker 705 can activate the call assistant device 715 in different ways, e.g., provide different types of user input, to perform different tasks. For example, a single press of the button 710 can be configured to perform a first task, a double press of the button 710 can be configured to perform a second task, a hard press of the button 710 can be configured to perform a third task, a long press of the button 710 can be configured to perform a fourth task and so on. That is, the user input can be based on number of times the button 710 is pressed, a duration of the press, a duration between each press, an intensity of the press etc.

When the speaker 705 activates the call assistant device 715, the processor 711 generates a command for performing the specified task in association with a specified call of the speaker 705, and the network component 712 transmits the command to the call management system 750 as a message 720. In some embodiments, call assistant device 715 transmits the message 720 to the call management system 750 wirelessly. The message 720 can include a device ID of the call assistant device 715, a timestamp which is indicative of a time at which the speaker 705 activated the call assistant device 715, e.g., pressed the button 710, and a type of user input, e.g., single press or double press of the button 710.

The call management system 750 receives the message 720 from the call assistant device 715 and executes a specified task in response to receiving the message 720. The call management system 750 includes a data transceiver component 730, a call analysis component 725, a task determination component 735, and a task execution component 740. The data transceiver component 730 receives the message 720 from the call assistant device 715 and analyzes the message 720 to extract message parameters, such as the device ID of the call assistant device 715, a timestamp indicative of a time at which the call assistant device 715 is activated by the user, and a type of the user input.

The task determination component 735 determines the specified task to be performed based at least on the device ID and the type of user action, which is described in detail at least with respect to FIG. 8 below. For example, consider that the specified task is to generate a summary of the call.

The call analysis component 725 determines the specified call in association with which the specified task is to be performed based at least on the device ID, which is described in detail at least with respect to FIG. 8 below. The speaker 705 can use the call assistant device 715 to perform the specified task in association with a real-time call, e.g., an ongoing call, or with an offline or a past call, e.g., a recording of the conversation. The call management system 750 receives data streams of real-time calls, such as real-time call data 760 of an ongoing call between the speaker 705 and a set of other speakers. The call management system 750 also has access to recording of the calls such as call data 755 stored at the storage system 125. The call data 755 can include a first recording 756 of a first call/conversation, a second recording 757 of a second call/conversation, and a third recording 758 of a third call/conversation. The recordings 756-758 can be of conversations between the same set of speakers or different set of speakers. When a task is to be executed with a specified call, the call management system 750 determines if the specified call is a real-time call, e.g., based on call metadata, and if it is a real-time call, the call management system 750 obtains the real-time call data of the specified call, e.g., real-time call data 760. On the other hand, if the specified call is not a real time call, the call management system 750 checks the call data 755 to determine if the specified call corresponds to a recording stored in the storage system 125, and in an event the specified call corresponds to the recording, the call management system obtains the corresponding recording, e.g., the first recording 756. If the specified call is neither an ongoing call nor is available at the storage system 125, the call management system 750 may store the message 720 in a queue for later execution, e.g., when the recording is available. Additionally, the call management system 750 may also notify the speaker 705 if the specified call is not found by the call management system 750. Upon finding the specified call, the task execution component 740 proceeds to execute the specified task in association with the specified call, as described below.

In some embodiments, the call analysis component 725 is similar to the offline analysis component 110 or the real-time analysis component 130 of FIG. 1. The call analysis component 725 analyzes the real-time call data 760 of a real-time call between the speaker 705 and a set of other speakers, and generates features of the conversation, such as the features 115 or features 135 as described at least with reference to FIGS. 1-5, based on the analysis. The real-time call data 760 can be tagged with metadata, such as one or more of ID of the speakers, ID of the call, subject of the call, start and end times of the call, location of the call, which can be used to identify the context of the conversation.

The features can include transcripts of the conversations, vocabulary, semantic information of conversations, summarization of a call, summarizations of utterances and various natural language entailments, voice signal associated features (e.g., speech rate, speech volume, tone, and timber), detected emotions (e.g., fear, anger, happiness, timidity, fatigue, laughter), detected personality traits (e.g., trustworthiness, engagement, likeability, dominance, charisma, confidence, etc.), personal attributes (e.g., age, accent, and gender), and inter-speaker attributes that indicate a comparison between both the participants (e.g., similarity of speech rate between the representative and the customer, extrovert/introvert matching, or gender or age agreement). The features can include usage of words or phrases features such as a specific word, phrase, and a pronoun. The features can also include any of length of utterances and/or turns taken by a participant in talking during the conversation, talk-to-listen ratio of a representative or a customer, or any other behavioral feature of the customer. The features can also include action items, next steps, or follow-ups for one or more of the speakers.

Further, the features can include not only aural features, but also non-aural features, e.g., visual features such as body language of a speaker, and facial expressions of the speaker, or any combination of aural and non-aural features. The features can be generated using any of a number of techniques, such as AI, ML, NLP, semantic analysis, or a rule-based technique.

The task execution component 740 can use one or more of the features generated by the call analysis component 725, in executing the specified task. The task execution component 740 can analyze the features to determine the necessary data for executing the tasks. For example, if the specified task is to generate a summary of the call, the task execution component 740 analyzes the features to determine a feature that corresponds to the summary of the call. If there is no feature that corresponds to the summary of the call, the task execution component 740 can request the call analysis component 725 to generate the summary. The summary can be generated using AI, ML, NLP, a process-driven technique (e.g., programmed by the consumer user) or a combination. In some embodiments, the task execution component 740 can analyze the features to derive the data necessary for performing the task. For example, if the specified task is to send a link to the document to other speakers, the task execution component 740 analyzes the features corresponding to the content of the specified call to determine the context of the conversation, e.g., the document the speakers are discussing in the conversation. After determining the document, the task execution component 740 accesses the document, e.g., from the storage system 125, and sends the document to the speakers.

In another example, if the specified task is to remind the speaker 705 a few minutes before the specified call is scheduled to end to review the action items, the task execution component 740 can analyze the metadata of the specified call (or the features if they include start and end time of the specified call) to determine the end time of the specified call and set the reminder time accordingly. Then, optionally or additionally, the task execution component 740 can also obtain the action items. The task execution component 740 can obtain the action items by analyzing the features to determine if there is a feature corresponding to the action items, if not, may request the call analysis component 725 to generate the action items. For example, the call analysis component 725 analyzes the features of a conversation to determine if any of the features are indicative of an action item. The features to be analyzed could be based on the usage of words or phrases in the conversation, such as "I'll send you an email after the call", "let me shoot you a proposal", "I can run that by manager and get back to you." Accordingly, the task execution component 740 can analyze the features to obtain the context/data necessary for executing the associated tasks. The task execution component 740 can be trained using AI, ML, a process-driven technique (e.g., programmed by the representative) or a combination, to analyze the features for determining the necessary data for performing the task.

The task execution component 740 can also obtain data necessary for executing a specified task from external systems, such as third-party systems 745. For example, if the specified task is to send an email notification regarding the action items to speakers in the specified call and if an email ID of a speaker is not available from the metadata associated with call, the task execution component 740 can obtain the email ID of the speaker from a third-party system 745 such as a social networking system or from an organization's database. The task execution component 740 can also access the calendar application of the speaker 705 to obtain the information regarding various speakers. In another example, for executing a task such as sending a panic alert, which sends a notification to a supervisor of the speaker 705 to join the specified call, the task execution component 740 accesses a server associated with the organization to which the speaker 705 belongs, analyzes an organizational chart to determine the supervisor of the speaker 705, and sends the notification to the supervisor.

Upon executing the specified task, the task execution component 740 generates a result 775 of the specified task. The result 775 can be made available to one or more of the speakers of the specified call, and in one or more forms. In some embodiments, the result 775 can be generated as one or more data files. For example, a result of a task for summarizing the call can be generated as a document having the summary, or an audio file having the summary. In some embodiments, the result 775 can be a notification to the speakers. For example, the notification is a vocal notification on the call, such as "Moment at minute 5 of the call bookmarked." In another example, the notification is a textual notification, such as e-mail, a text message, or an alert on a computing device associated with the speaker. In another example, the call management system 750 can provide a GUI for the speaker to view the notification and/or the result.

In embodiments where the call assistant device 715 is configured to receive voice commands from the speaker 705, the message 720 can include a recording of the voice command. The task determination component 735 extracts the voice command from the message 720 and analyzes the voice command to identify the task to be performed. The task execution component 740 can then perform the identified task.

Figure 8:
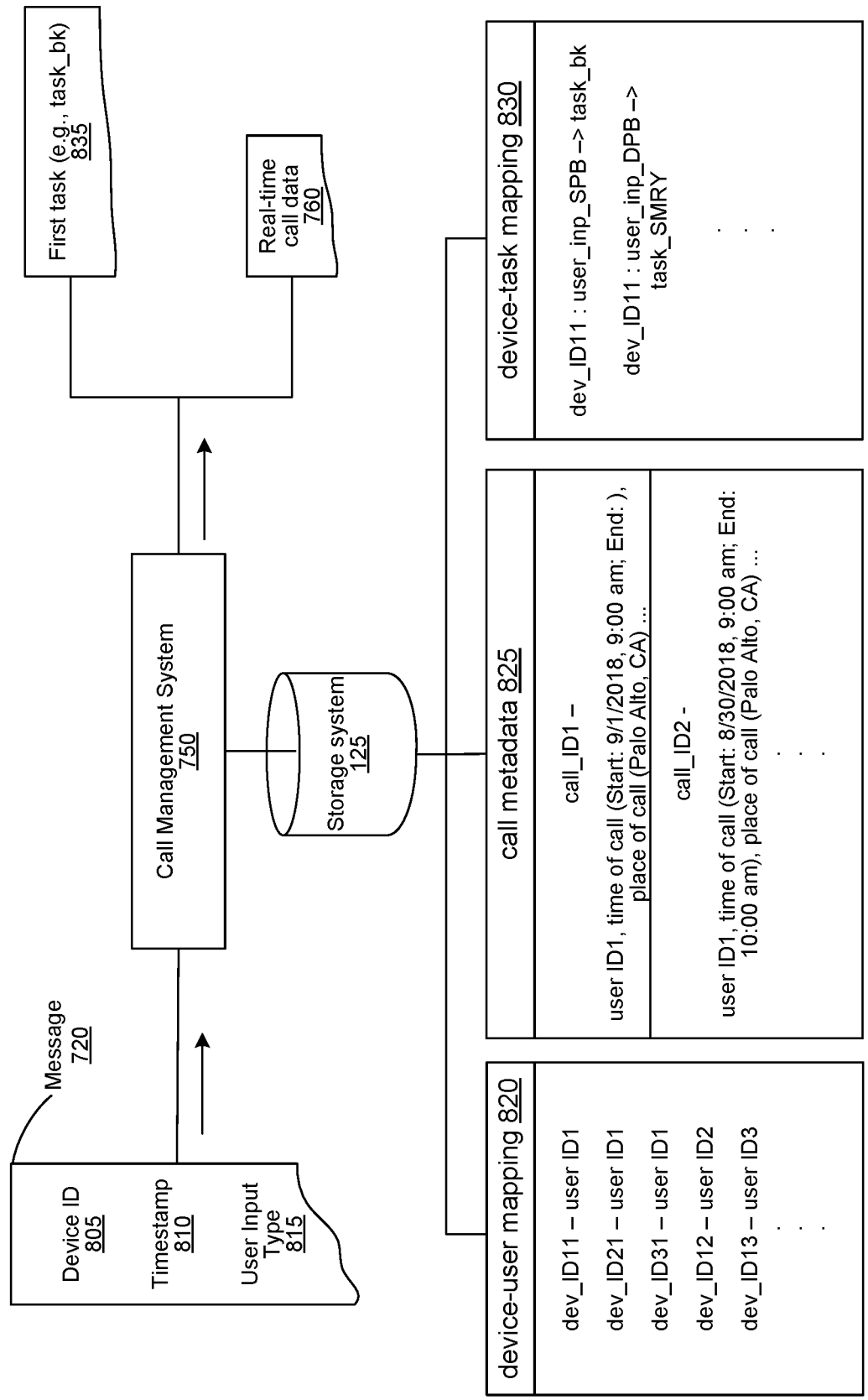
FIG. 8 is a block diagram illustrating determination of a specified task and a specified call with which the specified task is to be performed when a speaker activates the call assistant device, consistent with various embodiments.

FIG. 8 is a block diagram illustrating determination of a specified task and a specified call with which the specified task is to be performed when a speaker activates the call assistant device, consistent with various embodiments. A user, such as the speaker 705, can have one or more call assistant devices, such as the call assistant device 715, and each of the call assistant devices can perform a different task. For example, representatives of an organization may be provided with one or more call assistant devices. Each call assistant device is associated with a unique device ID and can be configured to perform at least one task. For example, the call assistant device 715 can be configured to perform a task such as generating a bookmark in a call when a user presses the button 710. Such call assistant devices may be provided to many representatives of the organization.

The call management system 750 manages the associations of the call assistant devices with the users, e.g., representatives of the organization such as the speaker 705, using a data structure such as a device-user mapping table 820. To associate a call assistant device with a user, a device ID of the call assistant device is mapped to a user ID of the user. For example, to associate the call assistant device 715 with the speaker 705, a device ID of the call assistant device 715, "dev_ID11," is associated with the user ID of the speaker 705, "user_ID1," in the device-user mapping table 820. If the speaker 705 has multiple call assistant devices, multiple such mappings are generated. For example, the device-user mapping table 820 indicates that the speaker 705, who has the user ID "user_ID1" is associated with two other devices—"dev_ID21" and "dev_ID31."

The call management system 750 manages the configurations of the call assistant devices, which define the specified tasks to be performed by a specific call assistant device for a specific type of user input, using a data structure such as a device-task mapping table 830. To configure a call assistant device to perform a specified task for a specified type of user input, a device ID of the call assistant device is mapped to a user input type (e.g., single press of the button, double press, long press) and to a task ID of the task. For example, to associate the call assistant device 715 with a bookmarking task for a single press of the button 710, a device ID of the call assistant device 715, "dev_ID11," is associated with the user action type "user_inp_SPB", which is indicative of the single press button user input type, and the task ID of bookmark, "task_bk," in the device-task mapping table 830. Similarly, to associate the call assistant device 715 with a summarizing task for a double press of the button 710, a device ID of the call assistant device 715, "dev_ID11," is associated with the user action type "user_inp_DPB", which is indicative of the double press button user input type, and the task ID of generating summary, "task_SMRY," in the device-task mapping table 830.

An administrator user, such as an administrator of the call management system 750 in the organization, can generate the above mappings for the call assistant devices. In some embodiments, the device-user mapping is generated when a user to whom the call assistant device is provided registers the call assistant device with a user account of the user in the organization. The call management system 750 provides a GUI using which a user and/or the admin user can manage the mappings and configurations of the call assistant device.

The above mapping tables are just examples for managing the mappings and configurations of the call assistant device. The call assistant devices can be managed in various other ways. For example, a call assistant device may be designed to perform a predetermined task, and therefore no configuration may be necessary from the user or the admin user. In another example, a call assistant device may be designed to perform a predetermined set of tasks, and therefore, the user or the admin user is restricted to selecting a task from the predetermined set of tasks.

The call management system 750 also stores metadata of the calls in a call metadata table 825, which can be used to identify a call. The metadata of the call includes a variety of information of the call, such as one or more of ID of the speakers, ID of the call, subject of the call, start and end times of the call, location of the call. A ID of the speaker can include user ID, name, email ID, contact number, or other such identification information. A call can be a real-time call, such as real-time call data 760, or recordings of calls or conversations, such as the recordings 756-758.

The speaker 705 can activate the call assistant device 715, e.g., by a single press of the button 710, during a real time call with a set of speakers. As described above at least with reference to FIG. 7, the call assistant device 715 generates a command in response to the activation of the call assistant device 715 and transmits the command as a message 720 to the call management system 750 over a communication network. Upon receiving the message 720, the call management system 750 analyzes the message 720 to extract parameters such as device ID 805, timestamp 810, and the user input type 815. The device ID 805 is indicative of the device ID of the call assistant device 715, e.g., "dev_ID11," the timestamp 810 is indicative of a time at which the call assistant device 715 is activated, and the user input type 815 indicates the type of user input, e.g., a single press of the button 710—"user_inp_SPB", provided by the speaker 705. The call management system 750 determines the specified task to be performed based on the device ID 805 and the user input type 815. For example, the call management system 750 queries the device-task mapping table 830 using the device ID 805 and the user input type 815 parameters to determine the specified task to be performed. Based on the device ID 805, "dev_ID11," and the user input type 815, "user_inp_SPB," the call management system 750 determines the bookmarking task—"task_bk," as the first task 835 to be performed by the call management system 750 in response to the speaker 705 activating the call assistant device 715.

Similarly, the call management system 750 also identifies the specified call with which the first task 835 is to be performed. For example, the call management system 750 queries the device-user mapping table 820 using the device ID 805 to determine the user associated with the device. Based on the device ID 805, "dev_ID11," the call management system 750 determines that the call assistant device 715 is associated with a user with "user ID1," who is the speaker 705. After determining the user associated with the call assistant device 715 as the speaker 705, the call management system 750 determines the specified call the speaker 705 is associated with using the user ID and the timestamp 810. For example, the call management system 750 queries the call metadata table 825 using the user ID, e.g., determined from the device-user mapping table 820, and the timestamp 810 to determine if the user is associated with any call during the time indicated by the timestamp 810. Assume that the timestamp 810 has the value "Sep. 1, 2018, 9:40 am." Based on the timestamp 810, the call management system 750 determines that the user with "user ID1" is in the call with call ID "call ID 1," e.g., which corresponds to real-time call data 760, that started at "Sep. 1, 2018, 9:40 am" and is currently in progress. Accordingly, the call management system 750 performs the first task 835, which is generating a bookmark in association with the real-time call data 760. For example, the call management system 750 generates a bookmark for the real-time call data 760, which when accessed plays a recording of the real-time call data 760 from a temporal location corresponding to the timestamp 810.

The call management system 750 can also execute a specified task in association with a recording of a call. For example, the speaker 705 can record an in-person conversation that is happening between the speaker 705 and other speakers in a meeting room, e.g., using a voice recorder, and upload the recording, e.g., the first recording 756, to the call management system 750 at a later time. Any activation of the call assistant device 715 during the conversation will cause the call assistant device 715 to send a message to the call management system 750. The message is queued (or otherwise stored) at the call management system 750 for execution at a later time, e.g., when the first recording 756 is available. For example, consider that the speaker 705 activated the call assistant device 715 during the in-person conversation at "10:00 am". The message corresponding to the activation is sent to the call management system 750 with a timestamp of "Sep. 1, 2018, 10:00 am." Upon receiving the message, the call management system 750 tries to find the corresponding call. The call management system 750 may not find any call associated with the speaker 705 for the corresponding timestamp. As a result, the call management system 750 stores the message, e.g., in a queue, at the storage system 125.

The call management system 750 may send a notification to the speaker 705 indicating that the corresponding call was not found, and may also prompt the speaker 705 to identify the call or upload the call for executing the specified task. If the call is already uploaded or available at the storage system 125, the speaker 705 can identify one of the calls in the call data 755. If the call is not available at the storage system 125, the speaker 705 may upload the first recording 756 to the call management system 750. Further, the speaker 705 can upload the first recording 756 in response to the prompt or at a later time. The call management system 750 may regularly check the call data 755 at the storage system 125 to determine if the first recording 756 is available. When the first recording 756 is available at the storage system 125, e.g., as a result of the speaker 705 uploading the first recording 756, the call management system 750 proceeds with executing the task corresponding to the message.

In some embodiments, the call assistant device 715 can queue the messages locally, e.g., at the call assistant device 715, for later transmission. For example, when the call assistant device 715 has no network connectivity, the speaker 705 may still use it for executing the specified. When the speaker 705 activates the call assistant device 715, the call assistant device 715 generates the message 720 and stores the message 720 in the memory 713, e.g., in a queue, in an event the call assistant device 715 has no network connectivity. When the network connectivity is restored, the call assistant device 715 transmits the messages stored in the memory 713 to the call management system 750.

Figure 9:
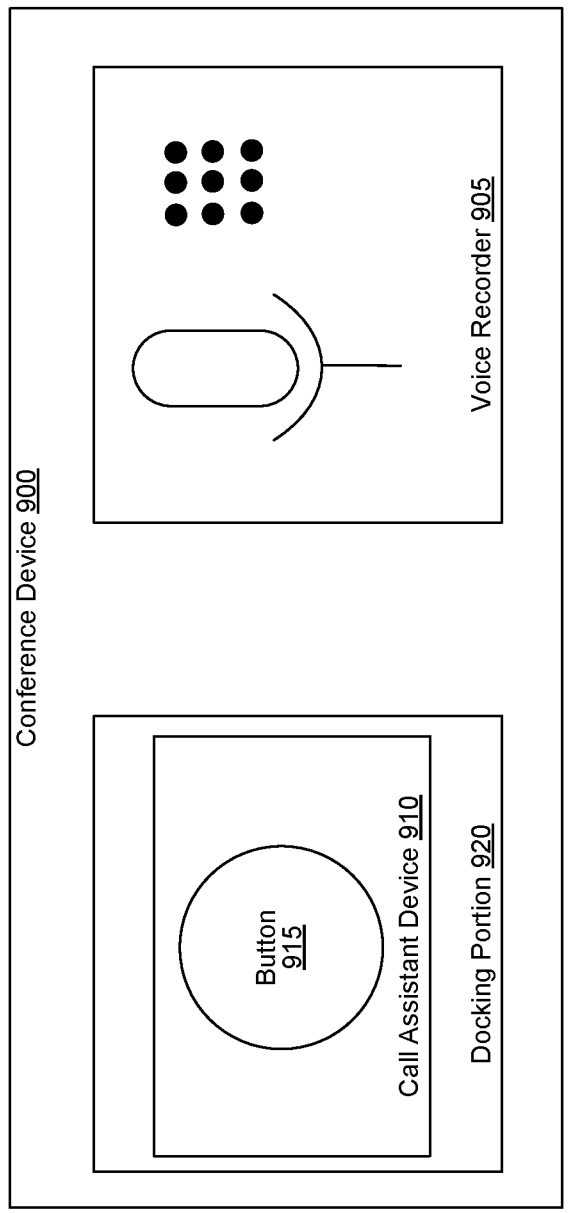
FIG. 9 is a block diagram of a conference device having a call assistant device, consistent with various embodiments.

FIG. 9 is a block diagram of a conference device 900 having a call assistant device, consistent with various embodiments. The conference device 900 can be IoT based, and includes a voice recorder 905 and a call assistant device 910. The voice recorder 905 can be used to record a conversation between speakers. The call assistant device 910, like the call assistant device 715 of FIG. 7, can be used to perform a specified task in association with a call or conversation of a specified user. In some embodiments, the call assistant device 910 is similar to the call assistant device 715. The call assistant device 910 has a button 915, which when activated, causes the call assistant device 910 to send a command to the call management system 750 to execute a specified task.

The call assistant device 910 can be removably attached to the conference device 900. For example, the call assistant device 910 can be removably docked or otherwise attached to the conference device 900 at docking portion 920 of the conference device 900. When docked, the call assistant device 910 can use one or more resources, e.g., power, network connectivity, of the conference device 900. Further, the battery of the call assistant device 910 can be charged using a power source of the conference device 900, which itself may be a battery. The docking portion 920 can also include electrical connections for electrically connecting the call assistant device 910 with the conference device 900. The electrical connectivity can be used for various purposes, e.g., to power the call assistant device 910, to charge the battery of the call assistant device 910, for the call assistant device 910 to use the network connectivity of the conference device 900 etc. Further, when the call assistant device 910 is removed from the conference device 900, the call assistant device 910 can communicate with the conference device 900 via a wireless connection.

Figure 10:
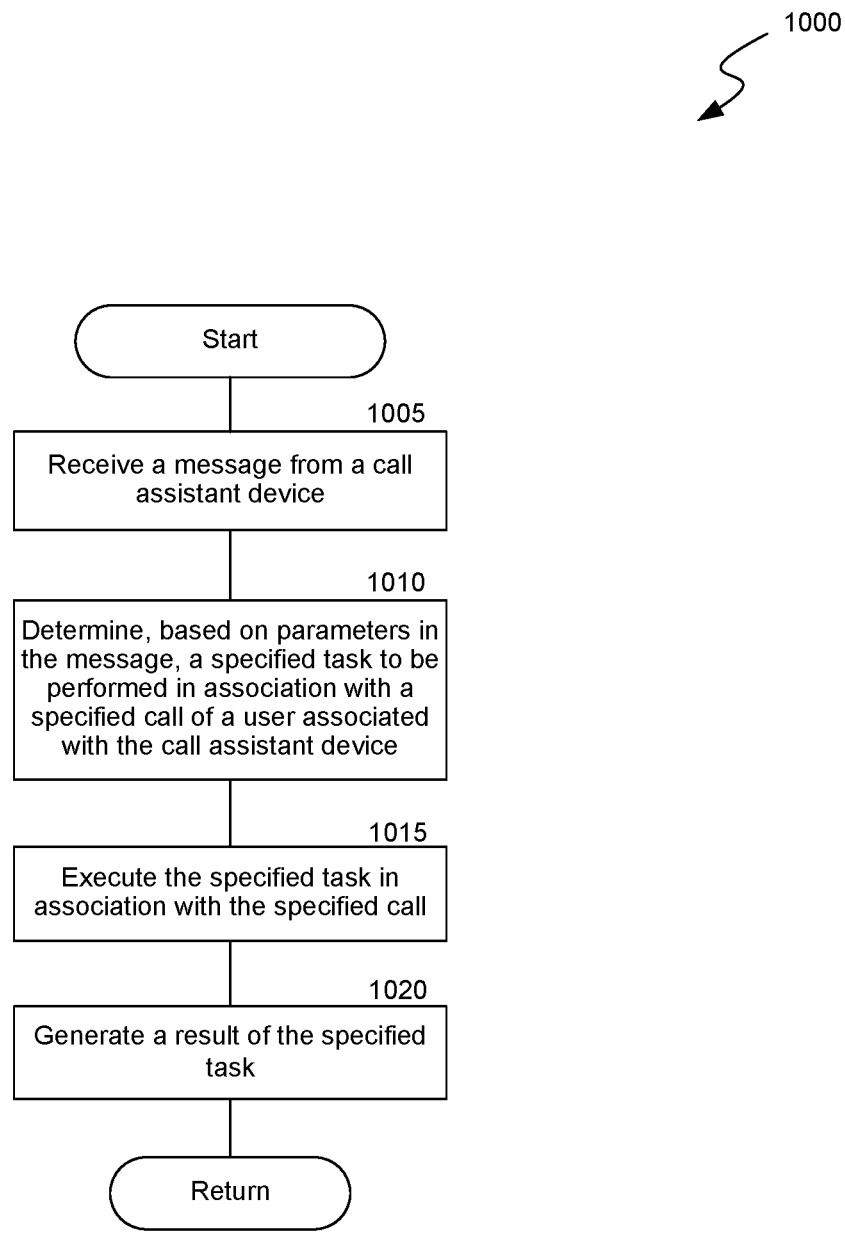
FIG. 10 is a flow diagram of a process for executing a specified task in association with a specified call using the call assistant device, consistent with various embodiments.

FIG. 10 is a flow diagram of a process 1000 for executing a specified task in association with a specified call using a call assistant device, consistent with various embodiments. In some embodiments, the process 1000 can be implemented in the environment 700 of FIG. 7. At block 1005, the data transceiver component 730 receives a message from the call assistant device. For example, the speaker 705 can activate the call assistant device 715, e.g., by pressing the button 710, to generate a command for executing a specified task. The command is transmitted from the call assistant device 715 to the call management system 750 as a message 720.

At block 1010, the task determination component 735 determines the specified task to be performed in association with a specified call of the user associated with the call assistant device. For example, the task determination component 735 determines the specified task to be performed in association with a specified call of the speaker 705. The task determination component 735 determined the specified task based on the parameters in the message, which is described at least with reference to FIGS. 11 and 12 below. Examples of a task include bookmarking a specified moment in the call, generating a summary of the call, generating an action item, searching for information regarding a particular entity, such as an organization, being discussed in the call and generating the search results, sending a panic alert to a particular user, generating a summary a previous call, or sending a link to a particular document to the speakers on the call.

At block 1015, the task execution component 740 executes the specified task in association with the specified call. For example, the task execution component 740 can execute a task such as bookmarking a specified moment in the real-time call data 760. The task execution component 740 may use the features of the specified call in executing the specified task, which is described at least with reference to FIG. 13 below.

At block 1020, the task execution component 740 generates a result of the specified task. For example, the task execution component 740 generates the result 775. The result 775 can be generated as one or more data files. For example, a result of a task for summarizing the call can be generated as a document having the summary, or an audio file having the summary. The result 775 can be a notification to the speakers. For example, the notification is a vocal notification on the call, such as "Moment at minute 5 of the call bookmarked."

Figure 11:
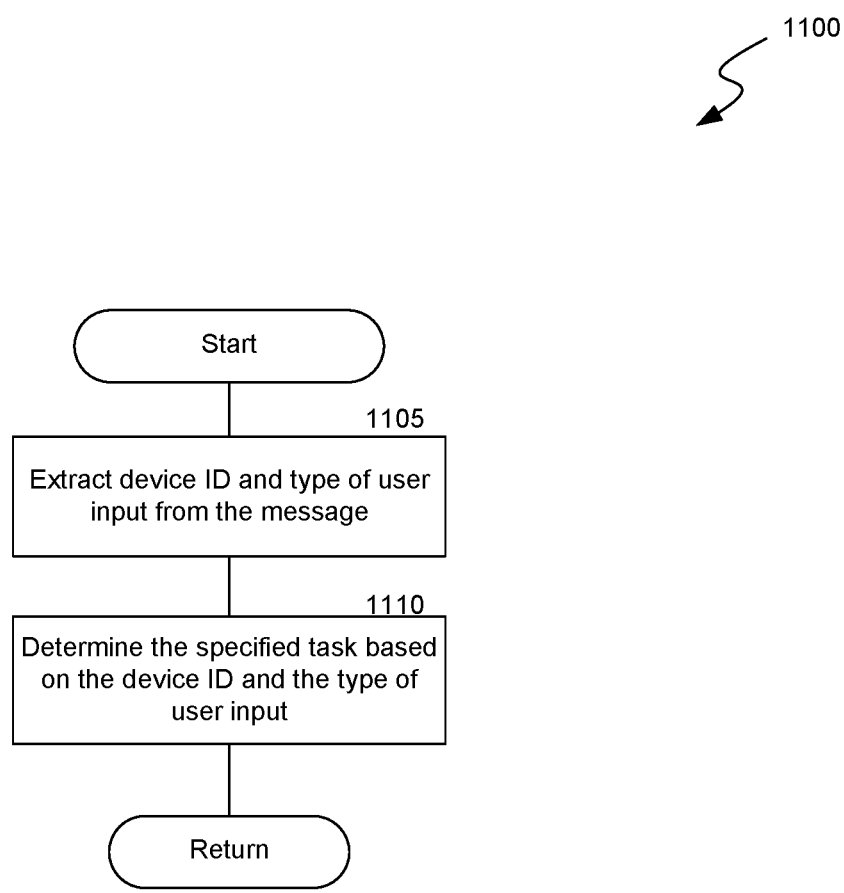
FIG. 11 is a flow diagram of a process for determining the specified task to be performed in response to a user activating a call assistant device, consistent with various embodiments.

FIG. 11 is a flow diagram of a process 1100 for determining the specified task to be performed in response to a user activating a call assistant device, consistent with various embodiments. In some embodiments, the process 1100 can be implemented in the environment 700 of FIG. 7, and as part of block 1010 of process 1000. At block 1105, the data transceiver component 730 extracts multiple parameters from the message received from the call assistant device, such as a device ID of the call assistant device and a type of user input. For example, the data transceiver component 730 extracts the device ID 805 of the call assistant device 715 and the user input type 815 from the message 720. Each call assistant device is associated with a unique device ID. The user input type 815 can be indicative of a type of activation of the call assistant device 715, e.g., single press of the button 710, double press, short press, or long press.

At block 1110, the task determination component 735 determines the specified task based on the device ID and the user input type. For example, the call management system 750 may have a table such as device-task mapping table 830 which has a mapping of the devices to specified tasks for specified types of user input. The task determination component 735 can query the device-task mapping table 830 using the device ID 805 and the user input type 815 from the message 720 and determine the specified task to be performed as the first task 835.

Figure 12:
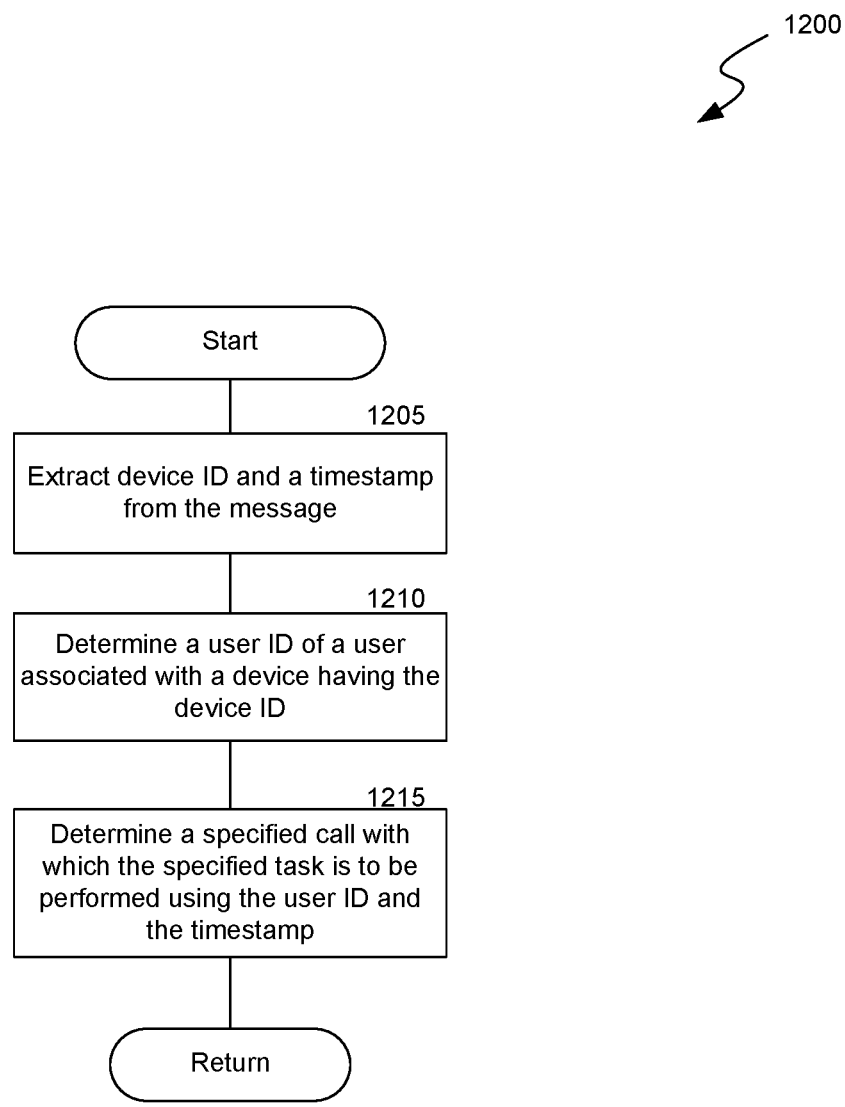
FIG. 12 is a flow diagram of a process for determining a specified call with which the specified task is to be performed, consistent with various embodiments.

FIG. 12 is a flow diagram of a process 1200 for determining a specified call with which the specified task is to be performed, consistent with various embodiments. In some embodiments, the process 1200 can be implemented using the call management system 750 of FIG. 7, and as part of block 1010 of process 1000. At block 1205, the data transceiver component 730 extracts multiple parameters from the message received from the call assistant device, such as a device ID of the call assistant device and a timestamp that is indicative of a time at which the call assistant device is activated. For example, the data transceiver component 730 extracts the device ID 805 of the call assistant device 715 and the timestamp 810.

At block 1210, the call analysis component 725 determines a user ID of the user of the call assistant device from which the message is received. The call analysis component 725 can use the device-user mapping table 820, which contains a mapping of the call assistant devices to the users, to determine the user associated with call assistant device 715. For example, the call analysis component 725 queries the device-user mapping table 820 using the device ID 805 and determines that the user associated with the call assistant device 715 is a user, e.g., the speaker 705, with user ID "user ID11."

At block 1215, the call analysis component 725 determines the specified call with which the specified task, e.g., determined in process 1100, is to be executed using the user ID and the timestamp. The call analysis component 725 can use the call metadata table 825, which contains call related information, such as one or more of ID of the speakers of a call, ID of the call, subject of the call, start and end times of the call, location of the call. For example, the call analysis component 725 queries the call metadata table 825 using the device ID 805 and the timestamp 810 and determines that the speaker 705 is associated with a real-time call, e.g., real-time call data 760.

Figure 13:
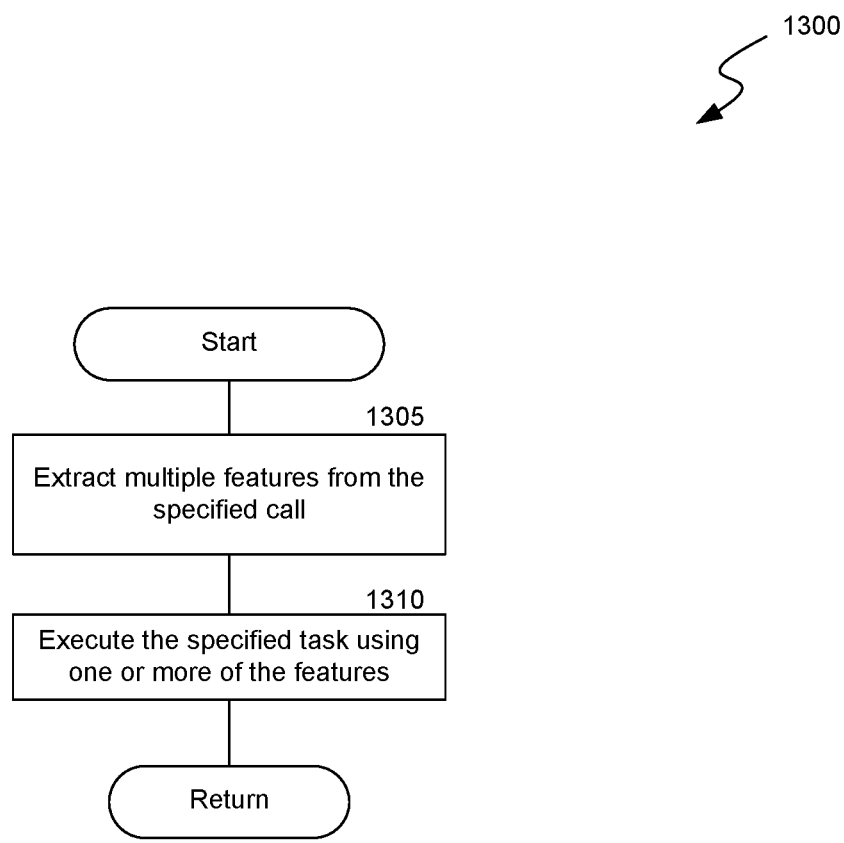
FIG. 13 is a flow diagram of a process for executing the specified task, consistent with various embodiments.

FIG. 13 is a flow diagram of a process 1300 for executing the specified task, consistent with various embodiments. In some embodiments, the process 1300 can be implemented in the environment 700 of FIG. 7, and as part of block 1015. At block 1305, the call analysis component 725 extracts multiple features from the specified call, e.g., real-time call data 760. The call analysis component 725 can use the feature generation component 111 or 113 for extracting the features.

At block 1310, the task execution component 740 executes the specified task in association with specified call using one or more of the features, e.g., as described at least with reference to FIG. 7. For example, the task execution component 740 can execute a task such as bookmarking a specified moment (corresponding to the timestamp 810) in the real-time call data 760. When the speaker 705 access the bookmark, the call management system 750 plays a recording of the real-time call data 760 from a temporal location corresponding to the timestamp 810.

Figure 14:
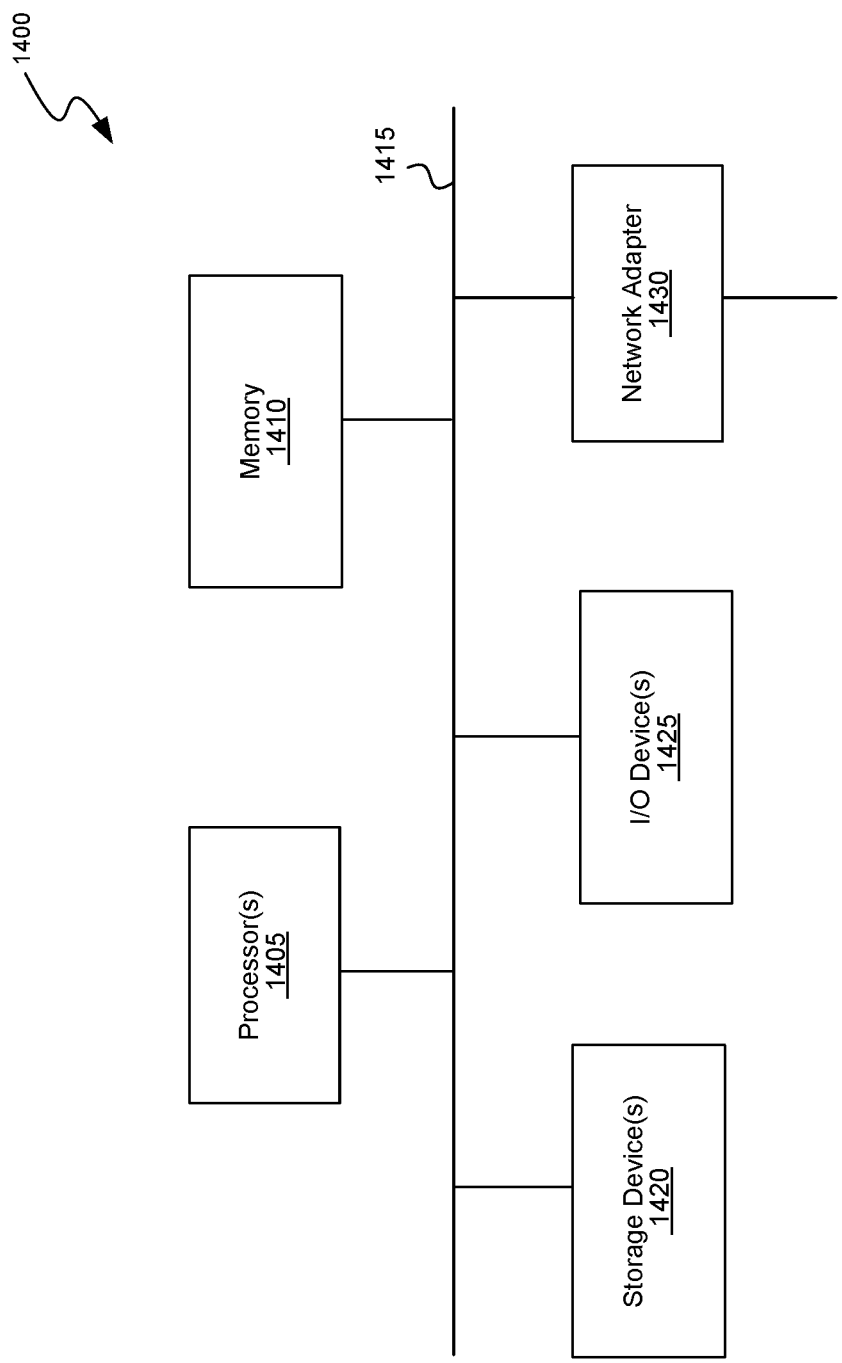
FIG. 14 is a block diagram of a processing system that can implement operations of the disclosed embodiments.

FIG. 14 is a block diagram of a computer system as may be used to implement features of the disclosed embodiments. The computing system 1400 may be used to implement any of the entities, components or services depicted in the examples of the foregoing figures (and any other components described in this specification). The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    receiving, at a computer system, a message from a call assistance device, wherein the call assistant device is associated with a user of the computer system, and wherein the message includes (a) a timestamp indicative of a time the message is sent from the call assistant device, (b) a device identification (ID) of the call assistant device, and (c) a type of action performed by the user on the call assistant device;
    determining, at the computer system and based on the type of action, a specified task to be performed in association with a specified call the user participated in, wherein the specified call is a conversation between the user and a set of speakers;
    executing the specified task in association with the specified call; and
    generating a result from executing the specified task.

2. The computer-implemented method of claim 1, wherein receiving the message includes receiving the message in response to invoking of a button on the call assistant device.

3. The computer-implemented method of claim 1, wherein the type of action performed by the user on the call assistant device includes at least one of a gesture performed by the user in association with the call assistant device, a number of times a button of the call assistant device is pressed, or a duration for which the button is pressed.

4. The computer-implemented method of claim 1, wherein determining the specified task includes:
    determining the specified task based on the device ID and the user input type.

5. The computer-implemented method of claim 1, wherein determining the specified task includes:
    storing, at a storage system, an association between a device ID of each of multiple call assistant devices and a specified function for a specified user input.

6. The computer-implemented method of claim 1, wherein determining the specified task includes:
    storing, at a storage system, an association between a device ID of each of multiple call assistant devices and a user ID of a user the corresponding call assistant device is associated with.

7. The computer-implemented method of claim 1, wherein determining the specified task includes:
    determining a user ID of the user based on the device ID, and
    determining the specified call from among multiple calls whose metadata includes the user ID of the user.

8. The computer-implemented method of claim 7, wherein determining the specified call includes:
    determining if the specified call is an ongoing call, and
    responsive to a determination that the specified call is the ongoing call, obtaining real-time call data associated with the ongoing call.

9. The computer-implemented method of claim 7, wherein determining the specified call includes:
    determining, at the computer system, that the specified call is a recording of the conversation between the user and the set of speakers,
    identifying the recording using the timestamp in the message, and
    obtaining the recording of the specified call.

10. The computer-implemented method of claim 1, wherein determining the specified task includes:
    extracting multiple features from the specified call, wherein the multiple features include at least one of characteristics of the user, characteristics of a speaker of the set of speakers, or characteristics associated with the conversation of the specified call, and
    executing, using one or more of the multiple features, the specified task.

11. The computer-implemented method of claim 10, wherein executing the specified task includes generating a summary of the conversation based on the multiple features.

12. The computer-implemented method of claim 11, wherein generating the summary includes generating the summary by performing a semantic analysis of the multiple features, the multiple features including one or more words or phrases in the call.

13. The computer-implemented method of claim 12, wherein generating the summary includes generating the summary using any of a rule-based, artificial intelligence (AI), machine learning (ML), or natural language processing (NLP) techniques.

14. The computer-implemented method of claim 10, wherein executing the specified task includes generating an action item of the specified call based on the multiple features, the multiple features including one or more words or phrases in the call that are indicative of an action item.

15. The computer-implemented method of claim 10, wherein executing the specified task includes generating a panic alert, the panic alert sending a notification to a specified user in an event the specified call is an ongoing call.

16. The computer-implemented method of claim 10, wherein executing the specified task includes generating a bookmark at a specified temporal location of the specified call corresponding to the timestamp, wherein the bookmark, upon access, enables playing of the specified call from the specified temporal location.

17. The computer-implemented method of claim 10, wherein extracting the features includes extracting the features using any of AI, ML, or NLP techniques.

18. The computer-implemented method of claim 1, wherein the specified call is at least one of a video call, an online meeting, a virtual reality based call, an augmented reality based call, or an email interaction between the user and the set of speakers.

19. The computer-implemented method of claim 1, wherein receiving the message includes:
sending the message from the call assistant device to the computer system in response to receiving a user input at the call assistant device.

20. The computer-implemented method of claim 1, wherein receiving the message includes:
receiving an input from the user at the call assistant device,
generating, at the call assistant device, the message in response to the input,
determining that the call assistant device is not connected to a communication network, and
storing the message in a memory of the call assistant device for later transmission to the computer system.

21. The computer-implemented method of claim 1, wherein receiving the message includes:
receiving the message in response to invoking a button associated with the call assistant device, the message including a voice command from the user,
analyzing the voice command to determine a task to performed, and
executing the task.

22. A non-transitory computer-readable storage medium storing computer-readable instructions, comprising:
instructions for sending, from a call assistant device to a computer system, a message in response to a user input received at the call assistant device from a user, the message including (a) a timestamp indicative of a time the user input is received at the call assistant device, and (b) a device identification (ID) of the call assistant device;
instructions for determining, at the computer system, a specified task to be performed in association with a specified call the user participated in, wherein the specified call is a conversation between the user and a set of speakers; and
instructions for executing the specified task in association with the specified call, wherein the executing includes extracting multiple features of the specified call and executing the specified task using one or more of the multiple features.

23. The non-transitory computer-readable storage medium of claim 22, wherein the instructions for executing the specified task include:
instructions for analyzing the multiple features to obtain data for performing the specified task, and
instructions for executing the specified task based on the data.

24. The non-transitory computer-readable storage medium of claim 23, wherein the instructions for analyzing the multiple features include:
instructions for obtaining the data from analyzing the multiple features, deriving the data from metadata of the call, or deriving the data based on data obtained from analyzing the multiple features.

25. The non-transitory computer-readable storage medium of claim 23, wherein the instructions for determining the specified task include:
instructions for determining a user ID of the user based on the device ID, and
instructions for determining the specified call from among multiple calls whose metadata includes the user ID of the user.

26. The non-transitory computer-readable storage medium of claim 25, wherein the instructions for determining the specified call include:
instructions for determining that the specified call is an ongoing call, and
instructions for obtaining real-time call data associated with the ongoing call.

27. The non-transitory computer-readable storage medium of claim 25 include:
instructions for determining that the specified call is a recording of the conversation between the user and the set of speakers,
instructions for identifying the recording using the timestamp in the message, and
instructions for obtaining the recording of the specified call.

28. The non-transitory computer-readable storage medium of claim 25 include:
instructions for determining that the specified call is neither an ongoing call nor a recording of the conversation available at a storage system, and
instructions for queuing the message in the storage system for later execution.

29. A system, comprising:
a call assistant device having a processor, a memory, a network component, and an input component, the network component configured to connect the call assistant device to a communication network, the processor configured to send a message in response to activation of the input component by a user, the message including (a) a timestamp indicative of a time of activation of the input component, and (b) a device identification (ID) of the call assistant device;
a first component that is configured to receive the message from the call assistant device;
a second component that is configured to determine a specified task to be performed in association with a specified call the user participated in, wherein the specified call is a conversation between the user and a set of speakers;
a third component that is configured to extract multiple features from the specified call, wherein the multiple features include any of characteristics of the user, the set of speakers or a conversation of the specified call; and
a fourth component that is configured to execute, using one or more of the multiple features, the specified task.

30. The system of claim 29, wherein the input component is a button, and wherein the call assistant device is activated based on a gesture performed by the user in association with the button, one or more presses of the button, a duration for which the button is pressed, or a duration between consecutive presses of the button.

31. An Internet-of-Things based device, comprising
a network component that is configured to connect the device to a communication network;
a memory that is configured to store a device identification (ID) of the device;
an input component that is configured to be activated by a user; and
a processor that is configured to send a message to a computer system over the communication network, wherein the message is sent in response to activation of the input component, the message including (a) a timestamp indicative of a time of activation of the input component, and (b) a device identification (ID) of the device, wherein the device causes the computer system to:

execute a specified task in association with a specified call of the user, wherein the specified call is a conversation between the user and a set of speakers, wherein the specified task is determined based on the device ID and a user ID of the user.

32. An Internet-of-Things based device, comprising:

a recording component to record a conversation between a user and a set of speakers; and a call assistant device that is configured to detachably couple with the recording device, wherein the call assistant device is configured to:

connect to a communication network directly or via the recording component, and send a message to a computer system over the communication network to execute a specified task in association with the conversation, wherein the message is sent in response to activation of the call assistant device, the message including (a) a timestamp indicative of a time of activation of an input component, and (b) a device identification (ID) of the call assistant device, wherein the specified task is determined based on the device ID and a user ID of the user.

* * * * *